United States Patent
Erickson et al.

(10) Patent No.: US 8,727,357 B2
(45) Date of Patent: May 20, 2014

(54) TOOLHOLDER SECONDARY RETENTION SYSTEM

(75) Inventors: Robert Alfred Erickson, Raleigh, NC (US); William Michael Long, Latrobe, PA (US); Paul Albert Brown, Hostetter, PA (US); Carla Erickson, legal representative, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 900 days.

(21) Appl. No.: 12/626,229

(22) Filed: Nov. 25, 2009

(65) Prior Publication Data
US 2011/0121523 A1    May 26, 2011

(51) Int. Cl.
*B23B 31/107*    (2006.01)

(52) U.S. Cl.
USPC ............................. 279/76; 279/22; 409/233

(58) Field of Classification Search
USPC ........ 279/76, 137, 22, 79, 127; 409/231, 232, 409/233, 234
See application file for complete search history.

(56) References Cited

U.S. PATENT DOCUMENTS

| | | | | |
|---|---|---|---|---|
| 751,345 A * | 2/1904 | Saunders | ........................ | 279/28 |
| 1,091,266 A * | 3/1914 | Young | ........................ | 294/86.31 |
| 1,656,450 A * | 1/1928 | Steuer | ............................. | 279/22 |
| 1,860,998 A * | 5/1932 | Drazick | ........................... | 279/76 |
| 2,136,190 A * | 11/1938 | Gulfelt | ............................. | 279/76 |
| 2,227,796 A * | 1/1941 | Quillen | ............................ | 279/76 |
| 2,801,859 A * | 8/1957 | Kopczynski | ................... | 279/97 |
| 3,156,479 A * | 11/1964 | Drazick | ........................... | 279/76 |
| 3,176,998 A * | 4/1965 | Parker | ............................. | 279/76 |
| 3,218,648 A * | 11/1965 | Casey | ........................... | 360/290 |
| 3,255,792 A * | 6/1966 | Beck | ................................ | 81/490 |
| 3,622,169 A * | 11/1971 | Koch et al. | ..................... | 279/76 |
| 3,698,748 A * | 10/1972 | Petri | ............................. | 403/328 |
| 3,738,766 A * | 6/1973 | Elder, Jr. | ....................... | 408/109 |
| 4,096,776 A * | 6/1978 | Laucke | ...................... | 83/698.91 |
| 4,604,931 A * | 8/1986 | Bastian et al. | .................. | 83/665 |
| 4,747,735 A | 5/1988 | Erickson et al. | | |
| 4,949,449 A * | 8/1990 | Wilson | ....................... | 29/402.08 |
| 4,981,057 A | 1/1991 | von Haas et al. | | |
| 5,026,224 A * | 6/1991 | Andersson et al. | ........... | 409/234 |
| 5,173,017 A * | 12/1992 | Oshnock et al. | .............. | 409/234 |
| 5,245,896 A * | 9/1993 | Erickson et al. | ................ | 82/160 |

(Continued)

FOREIGN PATENT DOCUMENTS

| | | |
|---|---|---|
| DE | 4343013 C2 | 6/1995 |
| DE | 4343013 | 4/2003 |

OTHER PUBLICATIONS

Monroe Engineering Web Page entitled "Steel Ball Nose Spring Plungers" dated at least as early as Nov. 24, 2008.

*Primary Examiner* — Eric A Gates
*Assistant Examiner* — Paul M Janeski
(74) *Attorney, Agent, or Firm* — Larry R. Meenan, Esq.

(57) ABSTRACT

A toolholder support member for retaining the shank of a toolholder has a bore to accept the toolholder shank. A retention member extends through the bore wall to engage a perforation extending through the shank or indentation within the shank, thereby retaining the shank within the receiving bore. The retention member is biased to provide resistance for insertion or extraction of the shank within the receiving bore. Furthermore, the retention bore is angled relative to the longitudinal axis of the receiving bore so that the force required to insert the toolholder within the receiving bore is minimized, while the force required to extract the toolholder from the receiving bore is maximized.

26 Claims, 10 Drawing Sheets

(56) References Cited

U.S. PATENT DOCUMENTS

| | | |
|---|---|---|
| 5,415,066 A | 5/1995 | Erickson et al. |
| 5,470,084 A | 11/1995 | Reibetanz et al. |
| 6,851,678 B2 * | 2/2005 | Mack .............................. 279/62 |
| 7,051,635 B2 * | 5/2006 | Morehead .................. 83/698.31 |
| 7,204,181 B2 * | 4/2007 | Goedeking ................ 83/698.91 |
| 2007/0013224 A1 * | 1/2007 | Stehney ........................ 299/104 |
| 2009/0273225 A1 * | 11/2009 | Hall et al. ..................... 299/113 |

* cited by examiner

TOOLHOLDER SECONDARY RETENTION SYSTEM

BACKGROUND OF THE INVENTION

1. Field of the Invention

The present invention relates to toolholders and toolholder support members used in the metalworking industry. In particular, the subject invention is directed to a secondary retention system that restrains a toolholder within a toolholder support member once the primary retention system has released the toolholder. The secondary retention system provides a machine tool operator with the opportunity to remove the toolholder from the toolholder support member in a controlled fashion.

2. Description of Related Art

Figure 1:
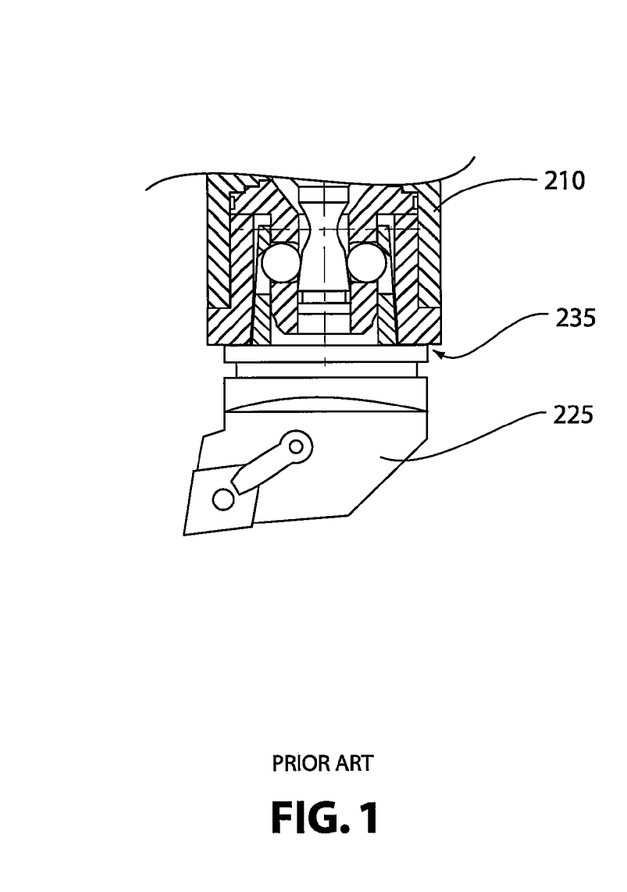
FIG. 1 is prior art and illustrates a sketch of a toolholder secured by a primary retention system within a toolholder support member.
Figure 2:
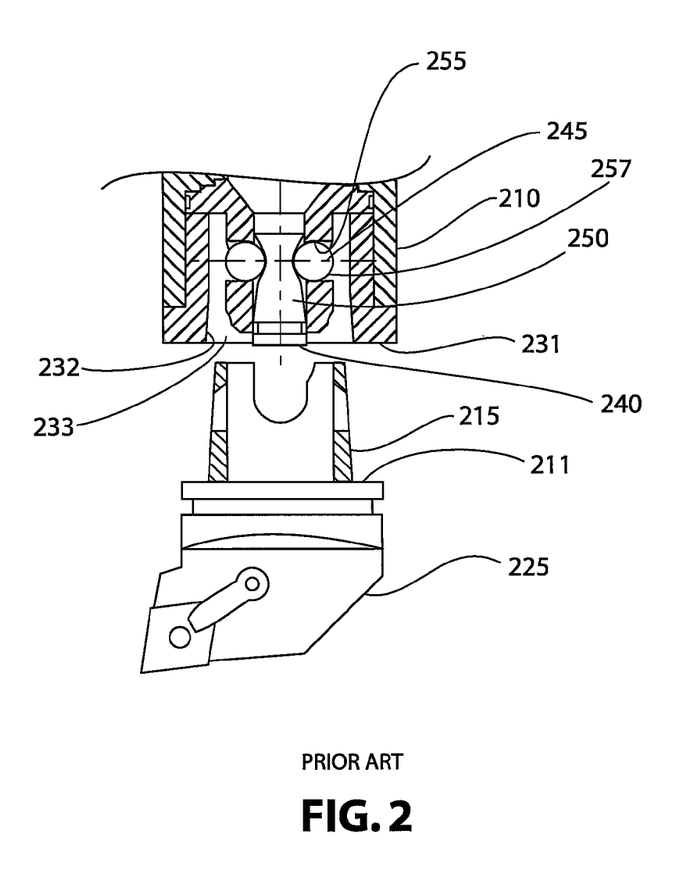
FIG. 2 is prior art and illustrates a sketch of a toolholder released from a toolholder support member.

U.S. Pat. No. 4,747,735 entitled "Toolholder and Method of Releasably Mounting" by Erickson, et al., which patent is assigned to the Assignee of the present application and the contents of which are hereby incorporated by reference, discloses a toolholder secured within a toolholder support member through radially displaceable locking balls which engage perforation surfaces within the shank of the toolholder to provide a primary retention system. A simplified version of the toolholder illustrated in the '735 patent is shown in FIGS. 1 and 2. In particular, the toolholder support member 210 receives the shank 215 of a toolholder 225 through face 211, 231 contacts between the toolholder 225 and toolholder support member 210 in the region 235. Additionally, there is a resilient interference fit between the shank 215 of the toolholder 225 and the wall 232 of the bore 233 of the toolholder support member 210. This mechanism for securing the toolholder 225 to the toolholder support member 210 is the primary retention system. When the toolholder 225 is removed from the toolholder support member 210 (FIG. 2), in order to overcome the resilient interference fit, the toolholder 225 is positively displaced using a bump-off mechanism 240 within the toolholder support member 210. Once the toolholder 225 is bumped-off from the toolholder support member 210, as illustrated in FIG. 2, the toolholder 225 is unrestrained within the bore 233 of the toolholder support member 210. In a most revealing example, if the toolholder 225 is vertically beneath the toolholder support member 210, then upon release, the toolholder 225 may freely fall from the support member 210. In some circumstances, the toolholder 225 may be fairly heavy and the machine tool operator may be required to use one hand to deactivate the primary retention system and the other hand to support the toolholder 225. The primary retention system is comprised of locking balls 245 that are radially activated by the lock rod 250 to engage forwardly facing surfaces 255 within the perforations 257 of the shank 215 of the toolholder 225. These locking balls 245, in conjunction with the face 211, 231 contacts and resilient interference fit, securely hold the toolholder 225 within the toolholder support member 210. However, once again, once the toolholder 225 is displaced from the toolholder support member 210, it is unrestrained and it is important for the operator to have full control over the toolholder 225 once it is released from the toolholder support member 210.

Under certain circumstances, a system is needed to provide a secondary retention to the toolholder once it is released from the primary retention of the toolholder support member.

SUMMARY OF THE INVENTION

A toolholder support member for retaining the shank of a toolholder has a toolholder support member body; with a receiving bore having a width and extending along a longitudinal axis within the body, wherein the receiving bore has a receiving bore wall and is adapted to receive the shank of the toolholder; and at least one retention arrangement. Each retention arrangement has a retention bore extending through the receiving bore wall along an axis non-parallel to the longitudinal axis of the receiving bore thereby defining an opening in the bore wall; and a retention member positioned within the retention bore having a first end protruding through the opening of the receiving bore wall. The retention arrangement also has a biasing bore associated with each retention bore; and a biasing element within the biasing bore urging the retention member toward the opening of the receiving bore wall. The retention member and the biasing element interact to allow the retention member to resiliently protrude through the opening of the bore wall to a depth of less than $\frac{1}{3}^{rd}$ of the receiving bore maximum width. As another indication of the retention member protrusion, the retention member may be a sphere and the sphere may protrude through the opening of the bore wall to a depth of less than $\frac{1}{3}^{rd}$ of the sphere diameter.

DESCRIPTION OF THE PREFERRED EMBODIMENTS

Figure 3:
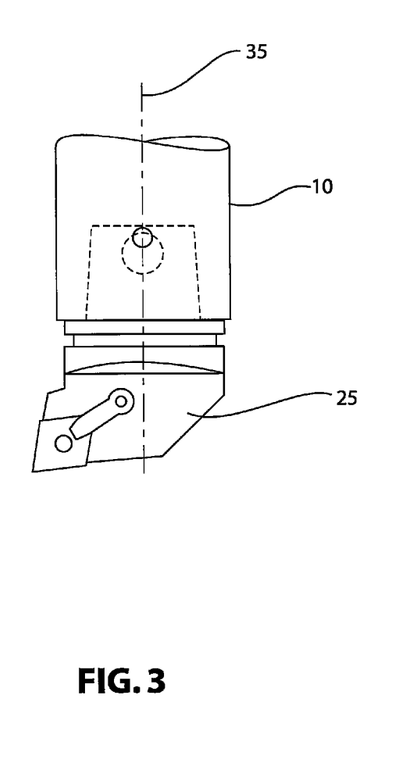
FIG. 3 illustrates a sketch of a top view of a toolholder mounted within a toolholder support member in accordance with the subject invention.
Figure 4:
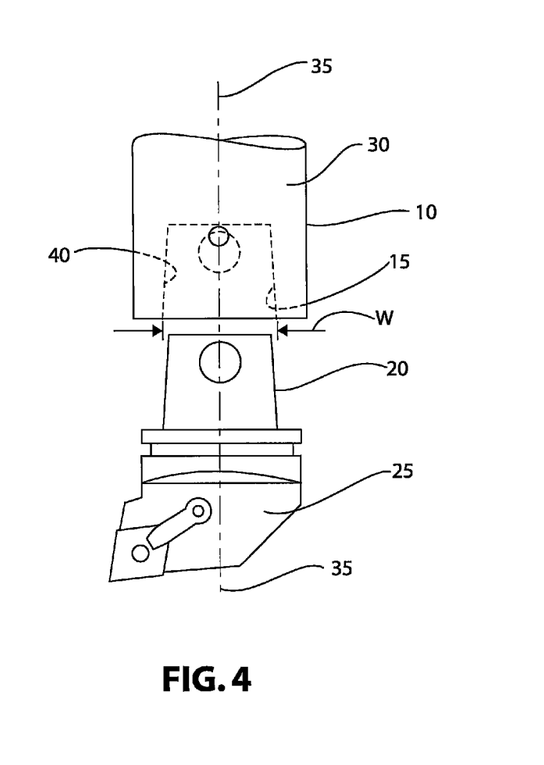
FIG. 4 illustrates a sketch of an exploded top view of the toolholder and toolholder support member separated from one another in accordance with the subject invention.

FIGS. 3 and 4 illustrate a toolholder support member 10 having a bore 15 extending therethrough for receiving the shank 20 of a toolholder 25. The receiving bore 15 has a width W and extends along a longitudinal axis 35 within the body 30 of the toolholder support member 10. The receiving bore 15 has a receiving bore wall 40 and is adapted to receive the shank 20 of the toolholder 25. Although only one mechanism for securing the toolholder 25 within the toolholder support member 10 has been illustrated with the drawings herein, it should be appreciated that the subject invention may be applicable to other commercial arrangements, whereby a toolholder is releasably secured within a toolholder support member and, whereby secondary retention of that toolholder, after it is ejected from the toolholder support member, may be desired.

Directing attention to FIGS. 5, 5A, 6, and 6A, a secondary retention arrangement 45 is comprised of a retention bore 50 extending through the receiving bore wall 40 along an axis 55 nonparallel to the longitudinal axis 35 of the receiving bore 15, thereby defining an opening 60 in the bore wall 40.

A retention member 65 is positioned within the retention bore 50 and has a first portion 70 protruding through the opening 60 of the receiving bore wall 40.

A biasing bore 75 is associated with each retention bore 50. A biasing element 80 within the biasing bore 75 urges the retention member 65 toward the opening 60 of the receiving bore wall 40. In the arrangement illustrated in FIGS. 5 and 6, the biasing bore 75 is co-axial with the retention bore 50.

Figure 5:
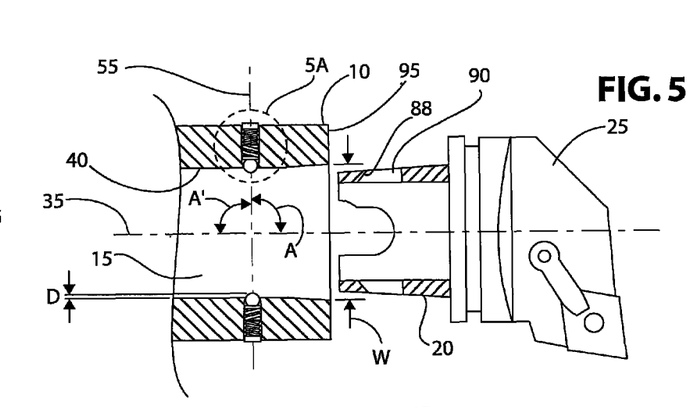
FIG. 5 is a cross-sectional side view of a toolholder and toolholder support member in an exploded orientation illustrating the subject invention.
Figure 5A:
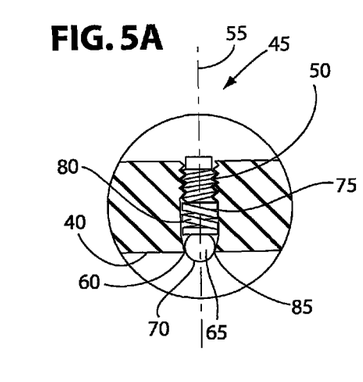
FIG. 5A is an enlargement of the encircled area labeled 5A in FIG. 5.
Figure 6:
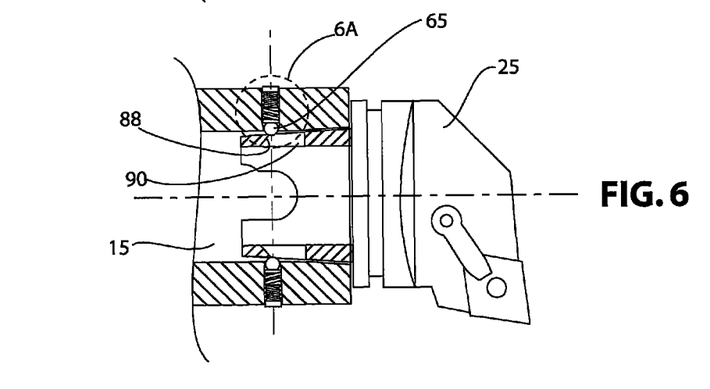
FIG. 6 is a cross-sectional side view of the toolholder and toolholder support member of FIG. 5 in the assembled state.
Figure 6A:
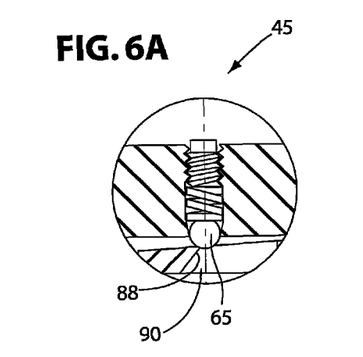
FIG. 6A is an enlargement of the encircled area labeled 6A in FIG. 6.

The retention member 65 and the biasing element 80 interact to allow the retention member 65 to resiliently protrude through the opening 60 of the bore wall 40 to a depth D of less than $\frac{1}{3}^{rd}$ of the maximum width W of the receiving bore 15. As another indication, the retention member 65 may be a sphere which protrudes through the opening 60 of the bore wall to a depth D of less than $\frac{1}{3}^{rd}$ of the diameter of the sphere.

The retention bore 50 has a restriction 85 in the region adjacent to the opening 60 of the receiving bore wall 40. The restriction 85 engages and limits the travel of the retention member 65. As illustrated in FIGS. 5 and 6, the retention member 65 is a sphere.

It should be noted that FIGS. 5 and 6 do not illustrate the primary retention mechanism, whereby the walls 88 of the perforation 90 of the shank 20 are engaged by locking balls (not shown) which pull and secure the toolholder 25 within the toolholder support member 10.

Figure 5B:
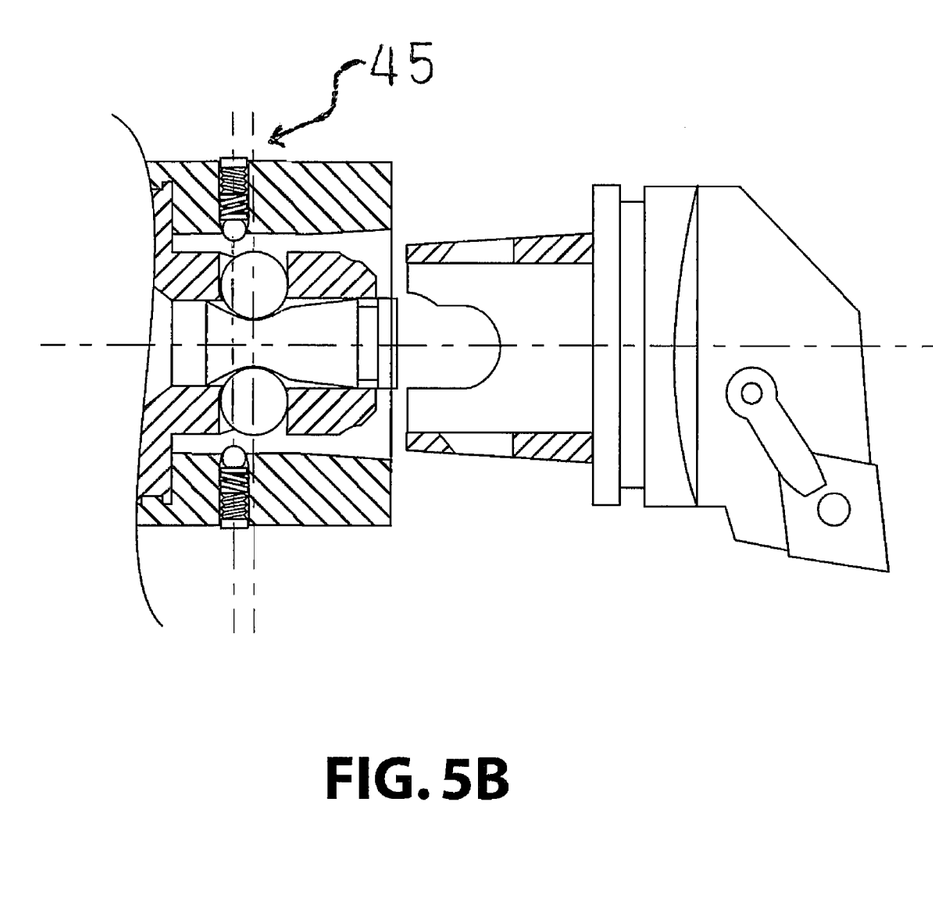
FIG. 5B is a cross-sectional view of the primary retention system together with the secondary retention system.

A FIG. 5B, however, illustrates this primary retention system and additionally the secondary retention system 45 shown in FIG. 5

Of interest however, the portion of the retention member 65 extending through the opening 60 is biased toward the opening 60 such that when the shank 20 of the toolholder 25 is within the receiving bore 15 (FIG. 6), the retention member 65 engages at least a portion of the perforation surface 90, thereby preventing the toolholder 20 from leaving the receiving bore 15 without pro-active involvement of the machine tool operator. In particular, as illustrated in FIG. 6, with the toolholder 25 loosely engaged within the bore 15 of the toolholder support member 10, the machine operator must physically pull the toolholder 25 from the bore 15 with a force sufficient to overcome the bias forcing the retention member 65 further into the opening 60. In this manner, even though a primary retention system between the toolholder 25 and the toolholder support member 10 may be disengaged, the biased retention member 65 continues to engage the wall 88 of the perforation 90 of the toolholder 20, thereby preventing the toolholder 25 from falling in an uncontrolled fashion from the receiving bore 15.

As illustrated in FIGS. 5 and 6, the axis 55 of the retention bore 50 forms an angle A with respect to the longitudinal axis 35 of the receiving bore 15 of approximately 90 degrees. With this arrangement, the extraction force (the force required to pull the toolholder 25 from the receiving bore 15) is generally the same for removing the toolholder 25 from the receiving bore 15 as it is to insert the toolholder 25 into the receiving bore 15. At least when the toolholder is oriented vertically, it would be preferred for the insertion force (the force required to insert the toolholder within the receiving bore 15) to be less than the extraction force.

In each of these instances, the radial force of the retention member 65 into the opening 60 must be overcome by the lateral motion of the toolholder 25. In particular, the retention member 65, which is illustrated in FIG. 6, protrudes within the perforation 90 of the shank 215 and must be displaced radially outwardly so that the retention member 65 exits the perforation 90 and permits removal of the toolholder 25 from the receiving bore 15. This is furthermore illustrated in FIG. 5. In particular, as illustrated in FIG. 5, the retention bore axis 55 forms an angle A with a segment of the longitudinal axis 35 from the opening 60 within the bore wall 40 to the shank bore front end 95 of approximately 90 degrees.

The focus of the subject invention is to provide a secondary retention system to retain the toolholder 25 within the receiving bore 15. However, it is not necessary to require the same force to insert the toolholder 25 within the receiving bore 15 as it is to remove the toolholder 25 from the receiving bore 15, as is the case in the embodiment illustrated in FIGS. 3-6.

Figure 7:
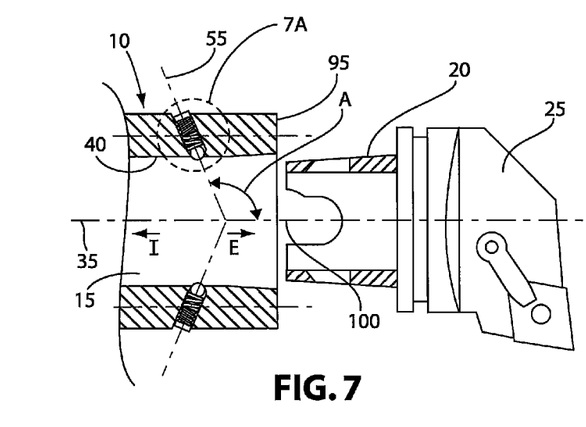
FIG. 7 is another embodiment of the toolholder support member in accordance with the subject invention.
Figure 7A:
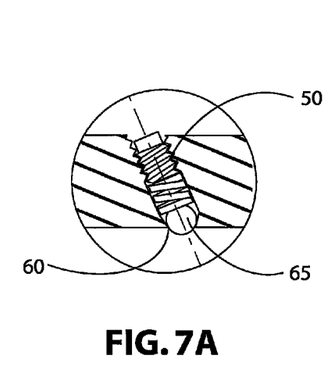
FIG. 7A is an enlargement of the encircled area labeled 7A in FIG. 7.
Figure 8:
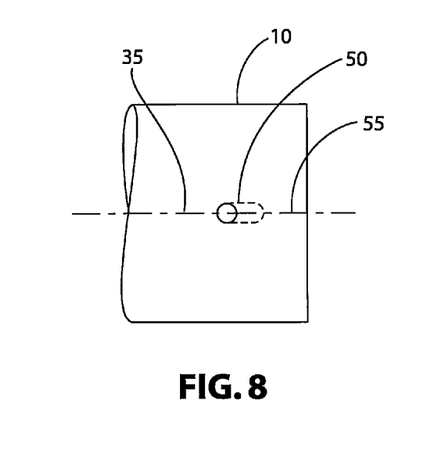
FIG. 8 is a top view of the arrangement illustrated in FIG. 7.

Directing attention to FIGS. 7 and 8, by angling the retention bore, such that the axis 55 of the retention bore 50 forms a non-perpendicular angle A with the longitudinal axis 35 along a segment 100 from the opening 60 within the receiving bore wall 40 to the shank bore front end 95 of greater than 90 degrees and up to 135 degrees. Preferably, the angle A is approximately 105 degrees.

Under certain circumstances, the angle A would be measured from the other side of the retention bore axis 50, illustrated as A' in FIG. 5.

As a result, the force required to insert the toolholder shank 20 into the receiving bore 15 in the direction I is less than the force required to remove the toolholder shank 20 from the receiving bore 15 in the direction of extraction E. This is a desirable arrangement because it is unnecessary to require a relatively large force to insert the toolholder 25 within the receiving bore 15.

It should also be noted in FIG. 8 that the retention bore 50 is along an axis 55 and that at least in the present embodiment, when viewed from the top of the toolholder support member 10, the axis 55 lies parallel to the longitudinal axis 35 of the receiving bore 15.

Figure 9:
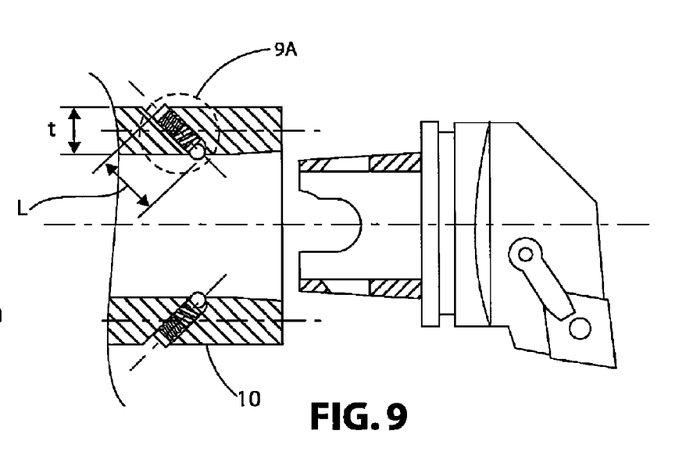
FIG. 9 is another embodiment of the toolholder support member in accordance with the subject invention.
Figure 9A:
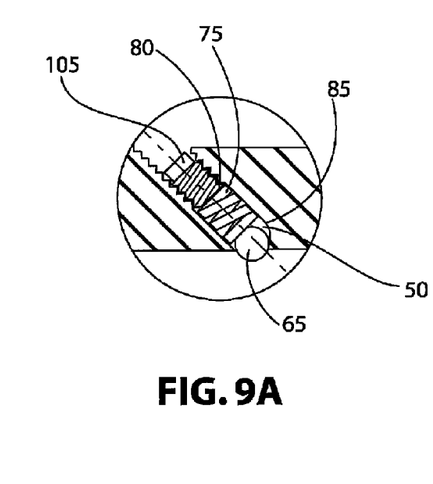
FIG. 9A is an enlargement of the encircled area labeled 9A in FIG. 9.
Figure 10:
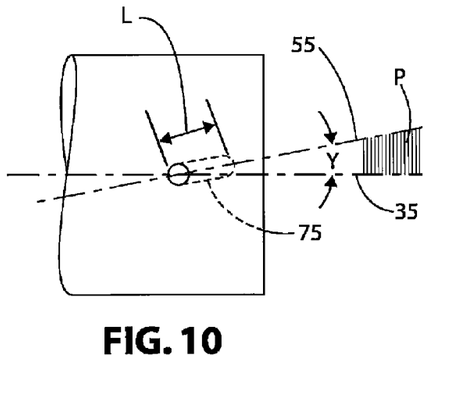
FIG. 10 is a top view of the arrangement illustrated in FIG. 9.

Directing attention to FIGS. 9 and 10, under certain circumstances the wall thickness t of the toolholder support member 10 may be relatively small and, as a result, the length L of the retention bore 50 may be limited. Since it is necessary to include the retention member 65 within the retention bore 50 and the biasing element 80 within the biasing bore 75, along with a biasing peg 105, that secures the retention member 65 within the retention bore 50, it may be desirable to increase the length L of the retention bore 50 and the biasing bore 75. As seen in FIG. 9A, the retention bore 50 and the biasing bore 75 are co-axial with one another and, as a result, the bore appears to be unitary. However, as illustrated in FIG. 10, it is possible to increase the length L of the biasing bore 75 by angling the biasing bore 75 with respect to a plane P formed between the receiving bore axis 35 and the retention bore axis 55 by an angle Y of between 0 to 30 degrees. In the event the biasing bore 75 is angled with respect to plane P by an angle Y, then to provide a balanced counterforce, the diametrically opposed biasing bores 75, such as those illustrated on the top and bottom of the toolholder support member 10 in FIG. 9, would be oriented at equal and opposite angles. As an example, one bore would be oriented at an angle Y, while the other bore would be oriented at an angle −Y.

Figure 11:
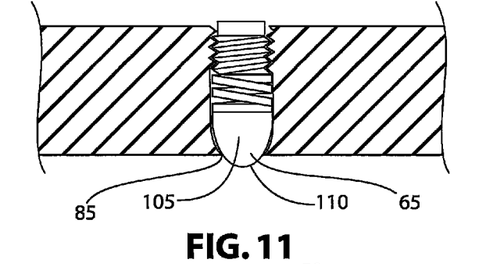
FIG. 11 is an embodiment of the subject invention showing that a pin may be used as an alternative to the spherical retention element.

What has been described so far are embodiments wherein the retention member 65 is a sphere. As illustrated in FIG. 11, it is entirely possible for the retention member 65 to be a pin 105 with a ball nose 110. With this arrangement, the pin 105 may be substituted for the sphere 65 illustrated in the previous embodiment.

Figure 12:
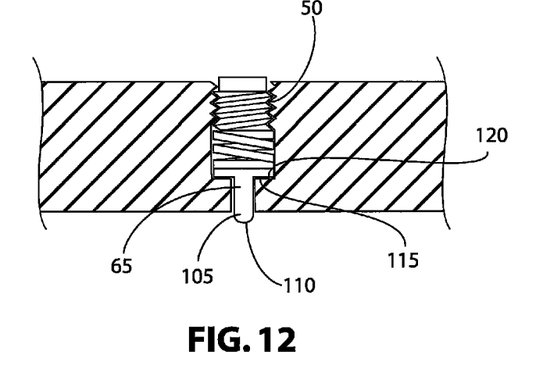
FIG. 12 is an embodiment of the subject invention showing that a pin having a shoulder may be used as an alternative to the spherical retention member.

Each of the previous embodiments have included a restriction 85 at the end of the retention bore 50 to keep the retention member 65 within the bore 50. Directing attention to FIG. 12, another embodiment of the pin 105 includes the ball nose 110, however, additionally includes a shoulder 115 that engages a ledge 120 within the retention bore 50 to limit the travel of the retention member 65 within the retention bore 50 without the need for the restriction 85 (FIG. 11) of the earlier embodiments.

Figure 13:
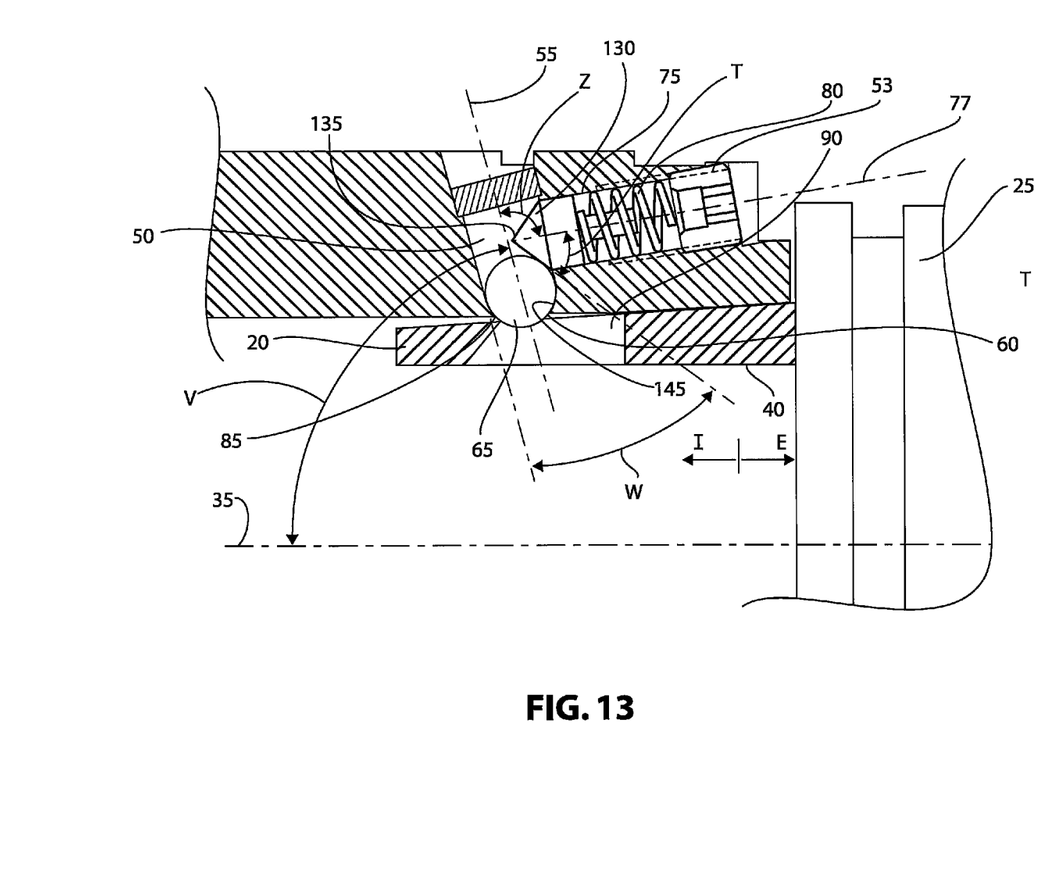
FIG. 13 is yet another embodiment of the toolholder support member in accordance with the subject invention.

What has been described so far are embodiments wherein the retention bore 50 and the biasing bore 75 are co-axial with one another, thereby forming a unitary bore. FIG. 13 illustrates an arrangement, whereby the retention bore 50 has an axis 55 while a separate biasing bore 75 has an axis 77, wherein the retention bore axis 55 forms an angle Z with the biasing bore axis 77. As illustrated in FIG. 13, the angle Z may be between 65 to 125 degrees and is preferably 90 degrees.

In accordance with this embodiment within the retention bore 50 is the retention member 65, which in this embodiment, is a sphere. Just as with an earlier embodiment, the retention bore 50 has a restriction 85 in the region adjacent to the opening 60 in the receiving bore wall 40. The restriction 85 engages and limits the travel of the retention member 65. The biasing bore 75 includes a biasing peg 130 located within the biasing bore 75 between the biasing element 80 and the retention element 65 to contact and to urge the retention member 65 through the opening 60. The biasing peg 130 may have a frusto-conical tip 135 forming a tip angle T with axis 77 of between 20 to 70 degrees, preferably 45 degrees. In the alternative, the biasing peg 130 may be a pin similar to that pin 105 in FIG. 11, but with a ball nose 110 at each end of the pin. As illustrated in FIG. 13, the biasing element 80 is a coil spring. A set screw 53 is threadably connected within the biasing bore 75 to secure the biasing element 80 within the biasing bore 75 and, furthermore, to adjust the compression of the biasing element 80 against the biasing peg 130.

The embodiment illustrated in FIG. 13 offers a variety of advantages to maximize the force required to remove the toolholder 25 (FIG. 4) from the receiving bore 15, while minimizing the force required to introduce the toolholder 25 (FIG. 3) within the receiving bore 15. In particular, when the toolholder 25 is inserted within the receiving bore 15 in the direction I, the toolholder shank 20 contacts the retention member 65 and urges it to the left and radially outward. With the design illustrated in FIG. 13, the retention bore wall 145 forms a wedging angle W with the frusto-conical tip 135 of the biasing peg 130 that, when the toolholder 25 is removed in direction E, provides mechanical advantage to the retention member 65 in displacing the biasing peg 130 to the right within the biasing bore 75 illustrated in FIG. 13.

On the other hand, with the shank 20 of the toolholder 25 already retained within the receiving bore 15, the retention member 65 captures the wall of the perforation 90 within the shank 20 and when the toolholder 25 is extracted in the direction E displacement of the retention member 65 is partially resisted by the opposing retention bore wall 145 and is then forced to contact the frusto-conical tip 135 in a direction that offers no mechanical advantage, but acts directly upon the biasing peg 130. As a result, the force required to insert the toolholder 25 within the receiving bore 15 is significantly less than the force required to extract the toolholder 25 from the receiving bore 15. To further assist in minimizing the insertion force of the toolholder 25 within the receiving bore 15, the axis 55 of the retention bore 50 forms an angle V with the longitudinal axis 35 of between 60 to 90 degrees, and preferably 75 degrees.

Figure 15:
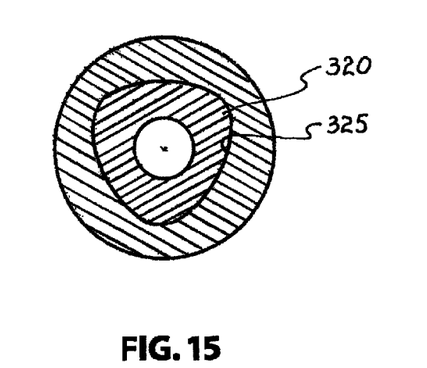
FIG. 15 is a cross-sectional view of a shank with a trichoidal shape with a mating receiving bore.

The shape of the shank 20 associated with the toolholder 25 may be circular, as illustrated, or any other shape associated with shanks for commercially available toolholders removably secured within toolholder support members. In particular, as illustrated in FIG. 15, the shank may also have a trichoidal shaped shank 320 with a mating receiving bore 315.

Figure 14:
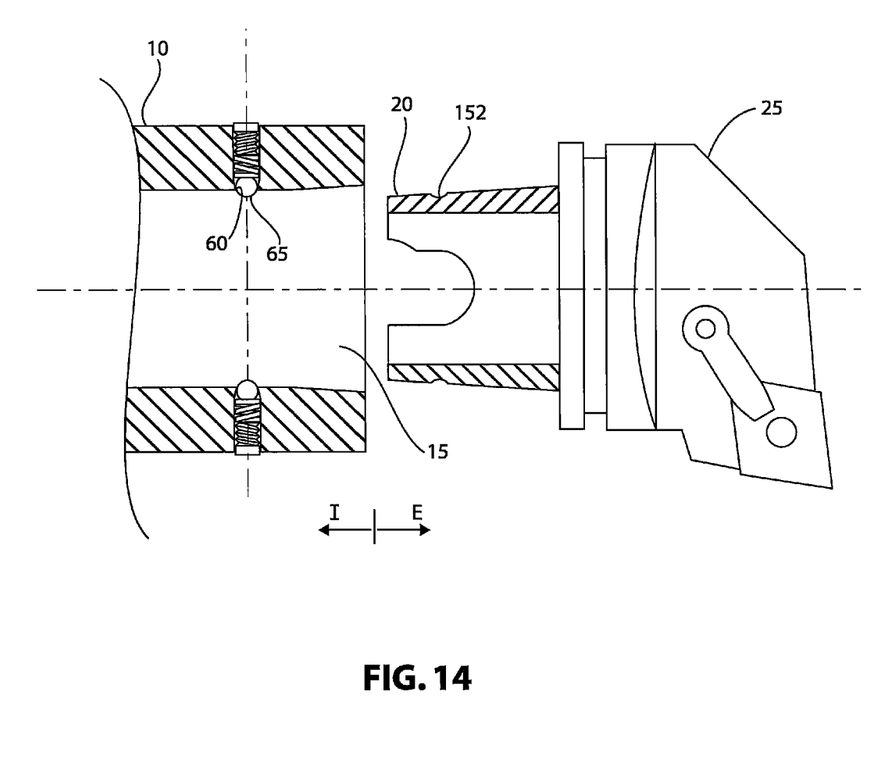
FIG. 14 is a sketch illustrating an indentation in the shank of a toolholder, wherein the retention element engages the indentation.

As discussed, the toolholder 25 associated with the toolholder support member 15 has a shank 20 with at least one perforation 90 extending through the shank wall. The perforation 90 (FIG. 13) is aligned with the bore opening 60 so that the retention member 65 engages the wall of the perforation 90 to retain the toolholder 25 within the receiving bore 15. In the alternative and directing attention to FIG. 14, the toolholder 25 may have a shank 20 with at least one indentation 152 within the exterior of the shank 20, rather than a perforation 90 through the shank 20, wherein the indentation 152 is aligned with the bore opening 60 so that the retention member 65 engages the indentation 152 to retain the toolholder 25 within the receiving bore 20.

A toolholder support member 10, in accordance with the subject invention, may allow for a number of adjustments to change the force required to insert the toolholder 25 in the insertion direction I and to extract the toolholder 25 in the extraction direction E. In particular, the retention bore angle V (FIG. 13) may be adjusted or the wedging angle W may be adjusted by selecting a different biasing peg 130. The biasing element 80 may be changed to provide an element with a different spring force, and the set screw 53 may be tightened or loosened within the biasing bore 75 to adjust the compression of the biasing element 80.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A toolholder support member for retaining a shank of a toolholder, wherein the toolholder support member comprises:

a) a toolholder support member body;
b) a receiving bore within the toolholder support member body, wherein the receiving bore has a width and extending along a longitudinal axis within the body, wherein the receiving bore has a receiving bore wall and is adapted to receive the shank of the toolholder;
c) a primary retention system within the toolholder support member body for securely holding the shank of the toolholder with a resilient interference fit within the receiving bore;
d) at least one secondary retention system within the toolholder support member body for retaining the toolholder shank within the receiving bore for use when the primary retention arrangement releases the shank from the toolholder, wherein each secondary retention system is comprised of:
  1) a retention bore extending through the receiving bore wall along an axis non-parallel to the longitudinal axis of the receiving bore thereby defining an opening in the bore wall;
  2) a retention member positioned within the retention bore having a first end protruding through the opening of the receiving bore wall;
  3) a biasing bore associated with each retention bore; and
  4) a biasing element within the biasing bore urging the retention member toward the opening of the receiving bore wall, wherein the biasing element provides the only force for preventing the retention member from retracting within the biasing bore;
e) wherein the retention bore has a restriction in the region adjacent to the opening in the bore wall, such that the restriction engages and limits the travel of the retention member; and
f) wherein the retention member and the biasing element interact to allow the retention member to resiliently protrude through the opening of the bore wall to a depth of less than $\frac{1}{3}^{rd}$ of the receiving bore maximum width.

2. The toolholder support member according to claim 1, wherein the retention member is a sphere.

3. The toolholder support member according to claim 1, wherein the retention member is a pin with a ball nose.

4. The toolholder support member according to claim 1, wherein the retention bore has a ledge and the retention member has a shoulder that engages the ledge of the retention bore to limit the travel of the retention member.

5. The toolholder support member according to claim 4, wherein the retention member has an end with a ball nose.

6. The toolholder support member according to claim 1, wherein the retention bore axis forms an angle A with a segment of the longitudinal axis from the opening within the bore wall to the shank bore front end of between 90-135 degrees.

7. The toolholder support member according to claim 6, wherein the angle A is preferably 105 degrees.

8. The toolholder support member according to claim 6, wherein the retention bore is co-axial with the biasing bore.

9. The toolholder support member according to claim 6, wherein the retention bore forms an angle Z with respect to the biasing bore.

10. The toolholder support member according to claim 9, wherein the angle Z is between 65-125 degrees.

11. The toolholder support member according to claim 10, wherein the angle Z is preferably 95 degrees.

12. The toolholder support member according to claim 10, wherein the biasing bore is further angled with respect to a plane formed by the receiving bore longitudinally and retention bore axis by an angle Y of between 0-30 degrees.

13. The toolholder support member according to claim 10, further including a biasing peg located within the biasing bore between the biasing element and the retention member to contact and to urge the retention member through the opening.

14. The toolholder support member according to claim 13, wherein the biasing peg has a frusto-conical tip with a tip angle T between 20-70 degrees.

15. The toolholder support member according to claim 14, wherein tip angle T is preferably 45 degrees.

16. The toolholder support member according to claim 13, wherein the biasing peg has an end with a ball nose.

17. The toolholder support member according to claim 1, wherein the biasing element is a coil spring.

18. The toolholder support member according to claim 17, further including a set screw threadably connected within the biasing bore to secure a spring within the biasing bore and to adjust the compression of the spring.

19. The toolholder support member according to claim 18, further including a biasing peg located with the biasing bore between the biasing element and the retention member to contact and to urge the retention member through the opening.

20. The toolholder support member according to claim 1, further including a circular bore within the toolholder support member to accept a circular shank.

21. The toolholder support member according to claim 1, wherein the shank bore is trichoidal to accept a trichoidal shank.

22. The toolholder support member according to claim 1, further including a toolholder having a shank with at least one perforation extending though the shank wall, wherein the perforation is aligned with the bore opening so that the retention member engages the perforation to retain the toolholder within the shank bore.

23. The toolholder support member according to claim 1, further including a toolholder having a shank with at least one indentation within the exterior of the shank wall, wherein the perforation is aligned with the bore opening so that the retention member engages the indentation to retain the toolholder within the shank bore.

24. The toolholder support member according to claim 1, wherein the retention bore axis forms an angle X with a segment of the longitudinal axis from the opening to the shank bore front end of between 90-135 degrees, wherein the biasing bore is angled with respect to the retention bore at an angle Y of approximately 95 degrees, and further including a biasing peg located with the biasing bore between the biasing element and the retention member to urge the retention member through the opening, wherein the biasing peg has a frusto-conical tip with a tip angle T of approximately 45 degrees.

25. A toolholder support member for retaining a shank of a toolholder, wherein the toolholder support member comprises:
  a) a toolholder support member body;
  b) a receiving bore within the toolholder support system body, wherein the receiving bore has a width and extending along a longitudinal axis within the body, wherein the receiving bore has a receiving bore wall and is adapted to receive the shank of the toolholder;
  c) a primary retention system within the toolholder support member body for securely holding the shank of the toolholder with a resilient interference fit within the receiving bore;

d) at least one secondary retention system within the toolholder support member body for retaining the toolholder shank within the receiving bore for use when the primary retention system releases the shank from the toolholder, wherein each secondary retention system is comprised of:
  1) a retention bore extending through the receiving bore wall along an axis non-parallel to the longitudinal axis of the receiving bore thereby defining an opening in the bore wall;
  2) a retention member positioned within the retention bore having a first end protruding through the opening of the receiving bore wall;
  3) a biasing bore associated with each retention bore; and
  4) a biasing element within the biasing bore urging the retention member toward the opening of the receiving bore wall, wherein the biasing element provides the only force for preventing the retention member from retracting within the biasing bore;
e) wherein the retention bore has a restriction in the region adjacent to the opening in the bore wall, such that the restriction engages and limits the travel of the retention member; and
f) wherein the retention member is spherical and the biasing element interacts with the retention member to allow the retention member to resiliently protrude through the opening of the bore wall to a depth of less than $\frac{1}{3}^{rd}$ of the diameter of the retention member.

26. A toolholder support member for retaining a shank of a toolholder, wherein the toolholder support member comprises:
a) a toolholder support member body;
b) a receiving bore within the toolholder support member body, wherein the receiving bore has a width and extending along a longitudinal axis within the body, wherein the receiving bore has a receiving bore wall and is adapted to receive the shank of the toolholder;
c) at least one retention system within the toolholder support member body; wherein each retention system is comprised of:
  1) a retention bore extending through the receiving bore wall along an axis non-parallel to the longitudinal axis of the receiving bore thereby defining an opening in the bore wall;
  2) a retention member positioned within the retention bore having a first end protruding through the opening of the receiving bore wall;
  3) a biasing bore associated with each retention bore; and
  4) a biasing element within the biasing bore urging the retention member toward the opening of the receiving bore wall,
d) wherein the retention bore has a restriction in the region adjacent to the opening in the bore wall, such that the restriction engages and limits the travel of the retention member;
e) wherein the retention member and the biasing element interact to allow the retention member to resiliently protrude through the opening of the bore wall to a depth of less than $\frac{1}{3}^{rd}$ of the receiving bore maximum width;
f) wherein the retention bore axis forms an angle A with a segment of the longitudinal axis from the opening within the bore wall to the shank bore front end of between 90-135 degrees;
g) wherein the retention bore forms an angle Z with respect to the biasing bore, wherein the angle Z is between 65-125 degrees; and
h) a biasing peg located within the biasing bore between the biasing element and the retention member to contact and to urge the retention member through the opening, wherein the biasing peg has an end with a ball nose.

* * * * *